INVENTORS
B. TELL
J. M. WORLOCK
BY Wilford L. Wisner
ATTORNEY

United States Patent Office 3,365,581
Patented Jan. 23, 1968

3,365,581
OPTICAL MODULATORS
Benjamin Tell, Summit, and John M. Worlock, Millington, N.J., assignors to Bell Telephone Laboratories, Incorporated, New York, N.Y., a corporation of New York
Filed May 28, 1965, Ser. No. 459,856
13 Claims. (Cl. 250—199)

ABSTRACT OF THE DISCLOSURE

Photoelastic optical modulators for amplitude, phase, polarization and frequency modulation are made to provide more easily detectable modulation by employing a highly purified cadmium sulfide or zinc oxide crystal and a carrier light source having a wavelength within the absorption edge of the particular crystal, so that at least one of the photoelastic constants is increased over its long-wavelength value by more than enough to offset increased absorption of the carrier light. An elastic wave is propagated in the crystal in a direction to produce variations in the effective index of refraction that are related to the elastic wave by the photoelastic constant.

---

This invention relates to optical modulators.

The development of devices, such as lasers, that produce coherent electromagnetic radiation at optical frequencies has created a need for devices capable of modulating such radiation efficiently for communication and other purposes.

Although amplitude modulation, frequency modulation and polarization modulation of such radiation have been proposed, a search has continued for ways to increase the strength of the modulating effects.

One particular class of optical modulators receiving widespread attention utilizes the propagation of an elastic wave, more commonly called an acoustic wave or sound wave, in a material that produces an interaction between the elastic wave and electromagnetic radiation.

Typically, the interaction involves interference phenomena occurring in a substantial volume of material and is described in terms of one or more of the so-called photoelastic constants of the material.

It is an object of our invention to strength the modulating interaction between an elastic wave and electromagnetic radiation in an optical modulator.

Our invention resides in the discovery that, in selected materials, the photoelastic constants increase rapidly as the wavelength of the incident light approaches and varies through the absorption edge. The absorption edge is a range of wavelengths defining the long wavelength edge of the bandgap of the material. In this range, the absorption of incident radiation increases substantially as its wavelength decreases. However, in this range, we have found that the photoelastic constants increase rapidly enough to permit an increased degree of modulation of the incident light, which unexpectedly is more than sufficient to offset the deleterious effect of the increased absorption of the light near the absorption edge. In general, a useful effect according to the invention can be obtained throughout a limited range of wavelengths longer than the bandgap wavelength, in which range the photoelastic constants are substantially larger than normal, i.e., in which range of wavelengths the photoelastic constants are at least 25 percent larger than for the longer wavelengths, remote from the bandgap, for which the photoelastic constants would typically be substantially invariant. We prefer for practice of the invention operation in the range of wavelengths for which the photoelastic constants are more than double their normal values.

Preferred materials for modulators according to our invention are semiconductor materials such as highly purified ZnO or CdS.

Further features and advantages of the invention will become apparent from the following detailed description in conjunction with the drawing in which.

In the various embodiments of the invention to be described, it is desired to modulate an information signal upon a carrier light beam that is preferably coherent but could also be incoherent. The modulated carrier beam is then propagated through the distance separating the communicating parties, received and demodulated. Transmission, reception and demodulation techniques for modulated carrier light waves having various types of modulation are known and are compatible with the improved modulators contemplated by us. The unmodulated coherent light beam is typically provided by a laser, now well-known to the art.

It is characteristic of all embodiments to be described that the information signal first modulates an elastic wave, which in turn modulates the light beam by variously affecting the propagation velocities at various points within the light beam. The greater the path length of the light beam in the acoustic field, the greater will be the power contained in the modulated light. It is thus seen that the invention is concerned with a volume effect, that is, a bulk photoelastic effect. It depends upon a substantial propagation distance, typically many wavelengths, of the light within the modulating material. Our invention improves such modulators by increasing the strength of the modulating interaction more than enough to offset the deleterious effects of increased absorption of the carrier wave, in the sense that the modulated wave is rendered more easily detectable at a receiver.

As an illustration, assume that the strengthened modulating interaction increases the index or degree of amplitude or polarization modulation from 20 percent to 50 percent, a factor of 2½, while the carrier wave has half the output amplitude it would have retained with the prior-art weaker interaction. In spite of the increased attenuation of the carrier wave, the peak-to-peak amplitude of the modulation envelope has been increased by a factor of 1.25 and thus, is more easily detectable at the receiver. In the frequency modulation embodiments, the modulation index is not increased, but the strengthened interaction produces an output sideband of increased power despite the increased absorption of the modulating material.

Figure 1:
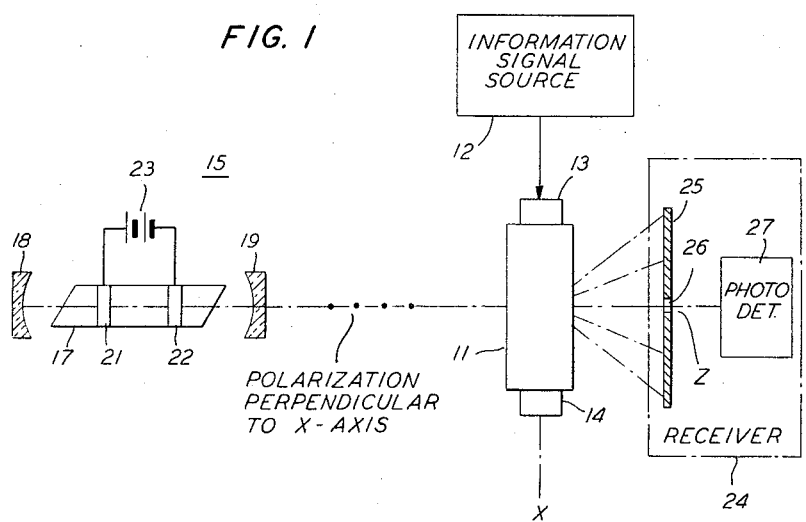
FIG. 1 is a partially pictorial and partially block diagrammatic showing of an embodiment of the invention adapted to produce amplitude modulation.

In FIG. 1, an amplitude modulator is composed as follows. A crystal 11 of substantially intrinsic cadmium sulfide is the modulating material. A source 12 of an information signal is coupled through a piezo electric transducer 13 to crystal 11 to apply thereto an elastic wave that varies in accordance with the information and preferably propagates in a piezoelectrically inactive direction, here designated the X-direction. An absorbing termination 14 is disposed on crystal 11 on a face opposite transducer 13 and absorbs the elastic wave so that a running elastic wave propagates within crystal 11.

An argon-ion gas laser 15, producing a coherent essentially monochromatic light beam at 5145 A., is disposed to direct its output beam in a direction, here designated the Z-direction, perpendicular to the direction of propagation of the elastic wave. The beam is polarized perpendicular to both the aforesaid directions, i.e., in the Y direction.

A portion of the radiation transmitted by the modulator is received at a receiver 24.

Cadmium sulfide crystal 11 can be fabricated as taught in U.S. Patent 3,093,758 of A. R. Hutson, issued June 11, 1963, with the modification that the growth process is recycled until the impurity concentration is substantially reduced; and then the crystal is compensated as taught in the patent. The crystal is preferably sufficiently perfect that its transmissivity at 5500 A. is at least half of its long wavelength value, i.e., at 10,000 A. It could also be grown by other methods. For purposes of the present invention, it is desirable that crystal 11 be as pure as possible. Cadmium sulfide crystal 11 could be replaced with a similarly pure zinc oxide crystal, made with similar modifications according to the technique of A. R. Hutson Patent 3,091,707, issued May 28, 1963, or made by other techniques, so that its transmissivity at 4500 A. is at least half of its long wavelength value, i.e., at 10,000 A.

Piezoelectric transducer 13 comprises a conventional piezoelectric transducer or ceramic transducer bonded to an X-axis end face of cystal 11. In accordance with the preferred embodiment, transducer 13 is poled in the thickness direction, provided with electrodes and suitably bonded to crystal 11 with the poling direction parallel to the longitudinal axis of crystal 11 to produce vibrations in the longitudinal mode. For example, transducer 13 may be an X-cut quartz crystal or a depletion layer of crystal 11 suitably provided with electrodes, as described in the copending patent application of D. L. White, Ser. No. 64,808 filed Oct. 25, 1960 and assigned to the assignee hereof. Transducer 13 could also be a doped crystalline layer suitably provided with electrodes, as described in the copending application of D. L. White, Ser. No. 208,185 filed July 3, 1962 and assigned to the assignee hereof. The signal from source 12 is applied to the electrodes as a variable amplitude voltage.

Termination 14 is an elastic wave absorber of known type, such as indium, mercury, or lead, that absorbs and dissipates the elastic wave energy reaching it without reflection. Alternatively, termination 14 can be eliminated, in which case standing waves will exist in crystal 11.

The longitudinal wave is propagated in a piezoelectrically inactive direction in crystal 11 to avoid light-sensitive ultrasonic attenuation of the type disclosed by A. R. Hutson et al. in the article "Ultrasonic Amplification in CdS," Physical Review Letters, vol. 7, No. 6, Sept. 15, 1961, p. 237.

Laser 15 comprises a tube 17 containing an ionized active argon gas and having Brewster angle end windows and near confocal reflectors 18 and 19 disposed beyond the end windows. Reflector 19 is partially transmissive. Laser 15 also includes excitation means including electrodes 21 and 22 and direct-current power source 23. It may be of the type disclosed in the copending application of E. I. Gordon et al., Ser. No. 439,657 filed Mar. 15, 1965 and assigned to the assignee hereof, but obviously could be any other monochromatic light source providing a light wavelength that falls upon the absorption edge of crystal 11, i.e., in the range between 5100 A. and 7000 A., and preferably between 5100 A. and 5500 A., for a cadmium sulfide crystal 11. For example, it could be a xenon-ion laser. It is noted that the band gap wavelength for cadmium sulfide is essentially 5100 A. For a zinc oxide crystal 11, laser 15 may be a krypton-ion laser operating, for example, at 4067 A. and built like the argon-ion laser, i.e., as disclosed in the above-cited copending application of E. I. Gordon et al., or any other monochromatic light source producing a wavelength between 3850 A. and about 5500 A., preferably between 3850 A. and 4500 A. It could also be an oxygen-ion laser. The bandgap wavelength for zinc oxide is essentially 3850 A.

The receiver 25, spaced a substantial distance from crystal 11, illustratively comprises a mask 25 with aperture 26 disposed in the normal direction from crystal 11, and a photodetector 27 disposed behind aperture 26.

It is particularly relevant to the operation of the preferred embodiment shown in FIG. 1 that the wavelength of the elastic wave is greater than the light wavelength and much less than the width of the light beam in order to obtain Raman-Nath diffraction of the incident light beam.

In operation, various rays of the beam from laser 15 will pass through portions of crystal 11 of slightly differing refractive index. Crystal 11 accordingly produces an effect similar to that of a diffraction grating; that is, the various rays interfere constructively in certain directions and interfere destructively in certain other directions as they leave crystal 11.

The intensity of the light in any of the constructive interference directions, e.g., in the normal direction, is related to the amplitude of the elastic wave and therefore to the amplitude of the information signal from source 12.

Illustratively, photodetector 27 will detect a central mode light intensity inversely related to the amplitude of the information signal.

The improved modulation according to the invention results from the greatly increased variation in index of refraction in crystal 11 in response to a given-amplitude elastic wave as a result of using a carrier light beam having a wavelength falling near the absorption edge of crystal 11. Specifically, depending upon the location of the carrier light wavelength in the appropriate range for the particular semiconductor material used, the degree of modulation can be greater than that obtained heretofore.

A detailed account of measurements of photoelastic constants which are indicative of the increased modulation effect is provided in our article with R. J. Martin, "Enhancement of Elasto-Optic Constants in the Neighborhood of a Band Gap," Applied Physics Letter, vol. 6, Apr. 1, 1965, at p. 123.

It appears that, not only in zinc oxide and cadmium sulfide but also in other compound semiconductors, the increased modulation obtained according to the invention should more than offset the increased attenuation of the carrier light attributable to operation near the absorption edge.

The increased modulation effect is substantially greater than that which could be expected from the known dispersion of the index of refraction of these materials near the bandgap. In the wavelength range of interest, the index of refraction varies only about 5 percent; but the photoelastic constants vary by more than a factor of 5, that is, more than 500 percent.

The embodiment of FIG. 1 can be modified in several respects. For example, the beam from laser 15 could be polarized parallel to the propagation direction of the elastic wave, in which case a different photoelastic constant is utilized. Likewise, the elastic wave could be propagated as a shear wave; or it could be propagated in a piezoelectrically active direction.

It should be clear from the foregoing description that the essential elements of the invention are a carrier light wavelength near the absorption edge of the modulating material and transmission of a light beam through a sufficient amount of the modulating material to obtain interference among various portions of the light beam.

Figure 2:
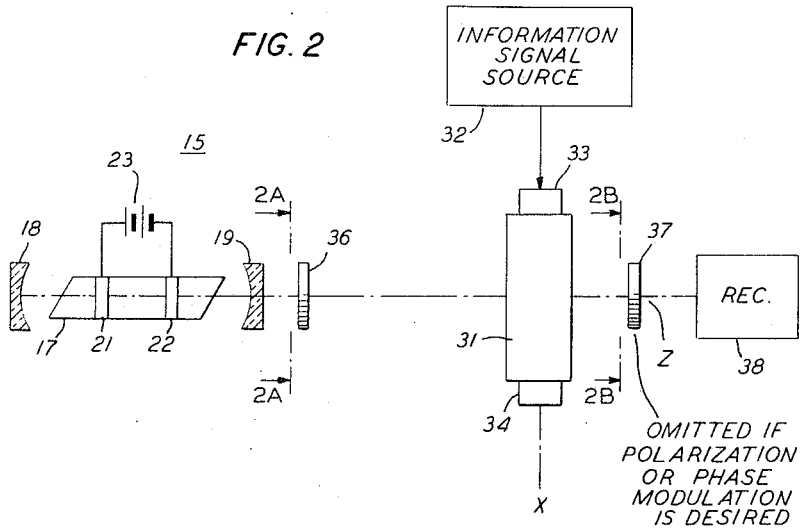
FIG. 2 is a partially pictorial and partially block diagrammatic showing of an embodiment of the invention adaptable to produce either phase modulation, amplitude modulation or polarization modulation.

In FIG. 2, laser 15 directs a coherent, monochromatic light beam at 5145 A. through cadmium sulfide crystal 31 along its optic axis (Z-axis). Information signal source 32 supplies through transducer 33 a longitudinal elastic wave that varies in accordance with the information and propagates along the X-axis of crystal 11. The elastic, or acoustic wavelength is chosen to be much greater than the light beam width so that we obtain no Raman-Nath diffraction of the light beam. The light is polarized by laser 15 or polarizer 36 in an appropriate direction as described hereinafter. The modulated light from crystal 31 is received at a distance by a receiver 38.

This regime of operation can produce phase modulation, polarization modulation or amplitude modulation.

We will first discuss phase modulation. This can be understood as follows. Since the light beam width is small compared to the elastic wavelength, the light waves see a refractive index that is constant in space, across a cross section of the light beam, but varying in time. That is, the wave front sees an index $n_0 + \Delta n \sin \omega t$, where $n_0$ is the index in the absence of sound, $\Delta n$ is the change induced by the elastic wave, and $\omega$ is the angular frequency of the elastic wave. Since the light propagation velocity is inversely proportional to the index, the light velocity is faster (slower) as the index is smaller (larger). In other words, the time which is required for the light wave to travel through the crystal 31 is varied by varying the index of refraction. When this time delay is equal to a period of the light wave, i.e., the reciprocal of frequency, 100 percent phase modulation is achieved.

It can be seen from this explanation that, if one wishes all of the light to experience the same phase modulation, the light should be polarized along or normal to the sound wave front (along the Y-axis or X-axis, respectively). Such polarization provides that the initially linearly polarized light will emerge linearly polarized.

Figure 2A:
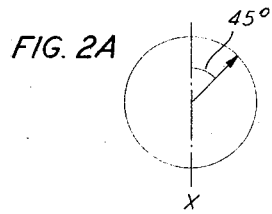
FIGS. 2A and 2B show polarization relationships at sequential indicated points in the embodiment of FIG. 2.
Figure 2B:
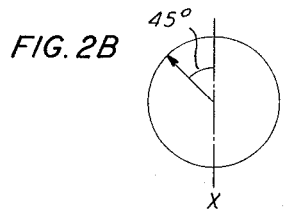

In contrast, for polarization or amplitude modulation, the light beam is polarized at an oblique angle, i.e., 45 degrees as shown in FIG. 2A, to the elastic propagation direction. For an amplitude modulation output, an analyzer 37, having a transmission axis orthogonal to the original polarization, as shown in FIG. 2B, will not transmit light in the absence of an elastic wave.

The elastic wave induces birefringence, since the changes in the refractive indices for light polarized parallel and perpendicular to the elastic wave propagation direction are related to respective different photoelastic constants and become correspondingly different in the presence of an elastic wave. As the indices of refraction become different for the orthogonally polarized beam components, they will experience a relative retardation. In general, an elliptical polarization will be produced at the output side of crystal 11. A 45 degree incident polarization produces the maximum effect. As the indices vary in time in response to the elastic wave, the elliptical output polarization is modulated. Thus, the polarization is modulated in response to the elastic wave. It is known how to demodulate modulated elliptical polarization. For example, this can be done with a receiver 38 which may be of the type shown in FIG. 2 of the copending application of M. G. Schachtman, Ser. No. 206,041, filed June 28, 1962, and assigned to the assignee hereof. For such a system, analyzer 37 is omitted.

Alternatively, with analyzer 37 present at the output of crystal 31, amplitude modulation is achieved on the output side of the analyzer, inasmuch as the amount of the light that can pass through the analyzer depends upon the elliptical polarization state of the light. In this case, receiver 38 may be a photodetector or similar receiver, located at a distance from analyzer 37.

In all three versions of the modulator of FIG. 2, the index of modulation depends upon the amount of change in the indices of refraction, which for a given amplitude level of the elastic wave depends upon the size of the photoelastic constants. Thus, enhanced modulation is obtained by operating with a light wavelength near the absorption edge of the crystal 11, i.e., so that the relevant photoelastic constants are enlarged at least by 25 percent, preferably more than doubled. In all three versions, the enhanced effect depends upon transmission of the light for a distance substantially longer than one-half wavelength in the crystal. The increased index of modulation more than offsets the attenuation of the carrier wave.

Figure 3:
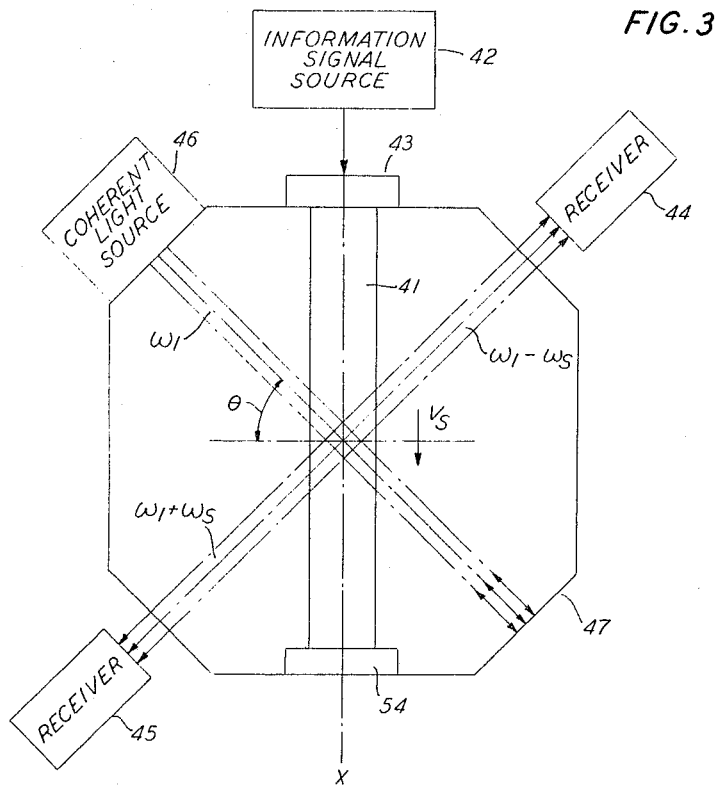
FIG. 3 is a partially pictorial and partially block diagrammatic showing of an embodiment of the invention adapted to produce frequency modulation.
Figure 4:
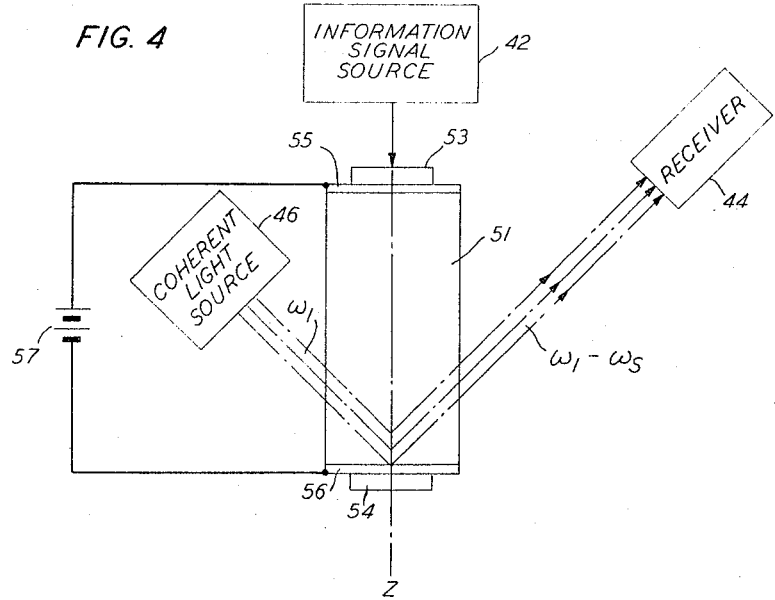
FIG. 4 is a partially pictorial and partially block diagrammatic showing of another embodiment of the invention adapted to produce frequency modulation.

The invention can also produce more easily detectable frequency modulation, as illustrated in FIGS. 3 and 4.

The structural arrangement of the modulator in FIG. 3 is similar to that shown in FIG. 4 of P. K. Tien's Patent 3,174,044, issued Mar. 16, 1965 with the modifications that crystal 41 is a crystal of a II–VI semiconductor such as cadmium sulfide or zinc oxide and that the coherent light source 46 provides a beam with wave-length falling near the absorption edge of crystal 41, i.e., so that the relevant photoelastic constants are enlarged by at least 25 percent, preferably more than doubled.

The beam from source 46, having the frequency $\omega_1$, is incident upon crystal 41 at the so-called Bragg angle, which is defined and explained in the above-cited patent of Tien.

The source 42 provides an information signal in the form of a frequency-modulated radio-frequency carrier wave. This wave is applied to a piezoelectric transducer 43 bonded to crystal 41. The disposition of transducer 43 and method of application of the wave from source 42 thereto, according to techniques known in the art, are appropriate for the propagation of a longitudinal elastic wave in a piezoelectrically inactive direction within crystal 41. Termination 54, an elastic or acoustic wave absorber of known type, insures that a running elastic wave exists within the crystal 41. The elastic wave has frequency $\omega_s$ and propagation velocity $V_s$. The reflective surface 47 provides increased utilization of the energy of the carrier beam within crystal 41.

Receiver 44 is a frequency modulation receiver adapted to operate at the lower sideband $\omega_1-\omega_s$; and receiver 45 is a similar receiver operating at the upper sideband $\omega_1+\omega_s$. These frequencies are also optical or near-optical, but may be reduced by steps to a frequency level appropriate for a conventional frequency-modulation receiver by heterodyning, for example, in other modulators like that of FIG. 3, and utilizing the lower sideband in each case.

When the beam of coherent light from source 46 is directed into the crystal 41 at an angle $\theta$ to the elastic wavefronts, i.e., to the lines of constant index of refraction, it is reflected or scattered from these wavefronts. For constructive interference of the reflected rays, the well-known Bragg relation should be substantially satisfied:

$$\lambda_1 = 2\lambda_s \cos \theta$$

where $\lambda_1$ is the carrier light wavelength, $\lambda_s$ is the wavelength of the elastic wave, the order of the diffracted wavelength under consideration is the first order, and $\theta$ is the aforesaid angle.

A shift of the frequency of the reflected wave occurs because the elastic waves are time-varying. This effect is explained more fully in the above-cited patent of Tien.

The beam from source 46 and the elastic waves are propagating in the same direction; and, consequently, the waves reflected toward receiver 44 are lengthened in wavelength and therefore down-shifted in frequency. The portion of the beam reflected from the silvered reflective surface 47 and the elastic waves are propagating in opposite directions; and, consequently, the waves reflected in a direction toward receiver 45 are shortened in wavelength and therefore up-shifted in frequency.

If the frequency of the elastic wave changes by small amounts in response to frequency modulation of the signal from source 42, the frequency shifts are modulated. Thus, the light beams directed toward receivers 44 and 45 are frequency-modulated without requiring changes in the orientations of the components involved.

As is characteristic of the invention, operation with the carrier light wavelength near the absorption edge of the modulating crystal 41 increases the interaction with the elastic waves running through the material. In spite of increased attenuation of the carrier light beam, and of the frequency-shifted light beams by crystal 41, the increased interaction of the light and the elastic waves produces an increased efficiency of conversion of the carrier beam into the frequency-shifted beams in the constructive interference directions, so that a frequency-modulated beam with an increased intensity or power level is received by receiver 44. The increased power level of the frequency-modulated transmitted beam renders it less subject to being swamped by noise and renders it more easily detectable at receiver 44.

A variation of the embodiment of FIG. 3 is shown in FIG. 4. This embodiment is adapted to increase still further the amplitude of the elastic wave in the modulation region via the technique of ultrasonic wave amplification.

The technique of ultrasonic amplification provided in FIG. 4 is basically that disclosed in the article "Ultrasonic Amplification in CdS" by A. R. Hutson et al., Physical Review Letters, volume 7, No. 6, p. 237 (1961).

To this end, a Z-cut crystal 51 of a semiconductor crystal, such as CdS or ZnO, is used, a bias electrode 55 is bonded to crystal 51 at its junction with transducer 53, and a bias electrode 56 is bonded to the crystal at its junction with termination 54. A direct voltage bias source 57 is connected between electrodes 55 and 56.

As disclosed in the above-cited article by Hutson et al., this bias enables amplification of the elastic wave by causing whatever charge carriers may be present in crystal 51 to drift in the direction of wave propagation faster than the elastic wave velocity.

It is a noteworthy characteristic of the FIG. 4 variation of the embodiment of FIG. 3 that frequency modulation occurs in the region of the most intense elastic wave, thereby complementing the use of a carrier wavelength of source 46 falling near the absorption edge of crystal 46 in producing a more intense and detectable frequency-modulated wave transmitted toward receiver 44.

While the foregoing description has been confined to a few preferred embodiments, it should be understood that the principles of the invention are more broadly applicable. In particular, other modulating materials having bandgaps, particularly other II–VI or III–V semiconductors appear promising for use according to the invention. It is understood that the invention is directed primarily to relationships within the modulator, regardless of the particular receivers used or whatever signal repeaters may come therebetween.

Further, inasmuch as in the description of every embodiment of the invention an interference phenomenon is described, it should be understood that it is desired that, to obtain a volume or bulk effect, the carrier light beam interact with the modulating material through a distance substantially greater than half a wavelength, i.e., a plurality of wavelengths, of the carrier wave. Various modifications of the disclosed embodiments are possible while still providing such an interaction distance.

What is claimed is:

1. Apparatus for modulating electromagnetic radiation, comprising a body of semiconductive material in which the index of refraction is varied by an elastic wave, said material exhibiting photoelastic constants at least 25 percent larger than normal within a range of incident radiation wavelengths longer than the bandgap wavelength which bounds said range, means for propagating an elastic wave in said body, and means for directing a beam of electromagnetic radiation having a wavelength within said range through said body in a direction to produce constructively interfering waves of said radiation outside of said body.

2. Apparatus according to claim 1 in which the elastic wave propagating means propagates an elastic wave modulated in accordance with information at a wavelength that is substantially longer than the light wavelength, but substantially shorter than the transverse dimension of the beam of light.

3. Apparatus according to claim 2 in which the elastic wave propagating means propagates a longitudinal elastic wave in a piezoelectrically inactive direction in the body of material.

4. Apparatus according to claim 1 in which the elastic wave propagating means propagates an elastic wave modulated in accordance with information at a wavelength substantially longer than the light beam width.

5. Apparatus for modulating electromagnetic radiation, comprising a body of semiconductive material in which the index of refraction can be varied by an elastic wave, said material exhibiting photoelastic constants 25 percent larger than normal within a range of incident radiation wavelengths longer than the bandgap wavelength which bounds said range, means for propagating a longitudinal elastic wave perpendicular to the optic axis in said body, and means for directing a beam of coherent electromagnetic radiation having a wavelength in said range along the optic axis of said body, the elastic wave having a wavelength longer than the beam width, said coherent radiation being polarized obliquely to the direction of propagation of the elastic wave.

6. Apparatus according to claim 1 in which the elastic wave propagating means propagates a frequency-modulated elastic wave and the coherent radiation directing means directs the radiation upon the body of material substantially at the Bragg angle with respect to the elastic wavefronts, whereby a frequency-modulation sideband is produced which has an enhanced power level because the wavelength of said radiation is in said range.

7. Apparatus according to claim 1 in which the body of material is a Z-cut semiconductive crystal, the elastic wave propagating means is disposed to propagate a frequency-modulated elastic wave in a piezoelectrically active direction and includes biasing means for enabling amplification of the elastic wave, and the radiation directing means is disposed to direct the radiation toward the region of most intense elastic wave amplitude in said crystal substantially at the Bragg angle with respect to the elastic wavefronts.

8. Apparatus for modulating coherent electromagnetic radiation, comprising a body of semiconductive material in which the index of refraction can be varied by an elastic wave, said material exhibiting a photoelastic constant at least twice as large as normal within a range of incident radiation wavelengths longer than the bandgap wavelength which bounds said range, means for propagating an elastic wave in said body in a direction to produce refractive index variations that are related to said elastic wave by said photoelastic constant, for directing a beam of coherent electromagnetic radiation having a wavelength within said range through said body in a direction to be modulated by said elastic wave, and means for receiving constructively interfering waves from said body.

9. Apparatus for modulating coherent electromagnetic radiation, comprising a body of photoelastic material in which a photoelastic constant has a value at least twice as large in a particular range of incident radiation wavelengths as a value thereof that is substantially invariant throughout another range of substantially longer wavelengths, means for propagating an elastic wave in said body in a direction to produce variations in an index of refraction that are related to said elastic wave by said photoelastic constant, and means for directing a beam of coherent electromagnetic radiation having a wavelength within said range into said body in a direction to interact with said elastic wave for a plurality of wavelengths of said coherent electromagnetic radiation.

10. Apparatus according to claim 9 in which the photoelastic material is a radiation-transmissive material having a bandgap.

11. Apparatus according to claim 9 in which the photoelastic material is a compound semiconductor crystal having a transmissivity at the longer wavelength bound of the particular range that is at least half its transmissivity at the substantially longer wavelengths.

12. Apparatus for modulating coherent electromagnetic radiation, comprising a cadmium sulfide crystal, said crystal having a photoelastic constant value at least twice as large between 5100 A. and 5500 A. as the photoelastic constant value that is substantially invariant throughout another range of substantially longer wavelengths, said crystal having a transmissivity at 5500 A. that is at least half its transmissivity at the substantially longer wavelengths, means for propagating an elastic wave in said crystal in a direction to produce variations in an index of refraction that are related to said elastic wave by said photoelastic constant, and means for directing a beam of coherent polarized electromagnetic radiation having a wavelength between 5100 A. and 5500 A. into said body in a direction to be affected by said index of refraction and to produce constructively interfering waves of said radiation outside of said body, whereby more easily detectable modulation is obtained than at said substantially longer wavelengths.

13. Apparatus for modulating coherent electromagnetic radiation, comprising a zinc oxide crystal, said crystal having a photoelastic constant value at least twice as large between 3850 A. and 4500 A. as the photoelastic constant value that is substantially invariant throughout another range of substantially longer wavelengths, said crystal having a transmissivity at 4500 A. that is at least half its transmissivity at the substantially longer wavelengths, means for propagating an elastic wave in said crystal in a direction to produce variations in an index of refraction that are related to said elastic wave by said photoelastic constant, and means for directing a beam of coherent polarized electromagnetic radiation having a wavelength between 3850 A. and 4500 A. into said body in a direction to be affected by said index of refraction and to produce constructively interfering waves of said radiation outside of said body, whereby more easily detectable modulation is obtained than at said substantially longer wavelengths.

References Cited
UNITED STATES PATENTS

| | | |
|---|---|---|
| 3,055,258 | 9/1962 | Hurwitz. |
| 3,159,707 | 12/1964 | Bennett et al. _____ 250—199 X |
| 3,174,044 | 3/1965 | Tien _____ 332—7.51 |
| 3,234,488 | 2/1966 | Fair _____ 333—30 |
| 3,281,713 | 10/1966 | Soules _____ 331—94.5 |
| 3,297,876 | 1/1967 | De Maria _____ 250—199 |

JOHN W. CALDWELL, *Primary Examiner.*